United States Patent
Seo

(10) Patent No.: US 7,898,235 B2
(45) Date of Patent: Mar. 1, 2011

(54) METHOD AND APPARATUS TO CONTROL VOLTAGE CONVERSION MODE

(75) Inventor: Kwang-youn Seo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 371 days.

(21) Appl. No.: 12/018,464

(22) Filed: Jan. 23, 2008

(65) Prior Publication Data
US 2008/0225563 A1    Sep. 18, 2008

(30) Foreign Application Priority Data
Mar. 14, 2007  (KR) .......................... 10-2007-0025136

(51) Int. Cl.
G05F 1/575    (2006.01)
G05F 1/565    (2006.01)
(52) U.S. Cl. ........................................ 323/284; 323/285
(58) Field of Classification Search .................. 323/282, 323/284, 285, 351, 299
See application file for complete search history.

(56) References Cited

U.S. PATENT DOCUMENTS

| 4,783,774 | A | * | 11/1988 | Enomoto | 369/44.27 |
| 5,475,296 | A | * | 12/1995 | Vinsant et al. | 323/223 |
| 6,137,267 | A | * | 10/2000 | Kates et al. | 320/136 |
| 2005/0128773 | A1 | | 6/2005 | Yang et al. | |

* cited by examiner

Primary Examiner — Gary L Laxton
(74) Attorney, Agent, or Firm — Staas & Halsey LLP

(57) ABSTRACT

A method and apparatus to control a voltage conversion mode in a voltage converter are provided. The apparatus to control a voltage conversion mode includes: a voltage converter which converts an input voltage to an output voltage and having a plurality of voltage conversion modes; an input sensor which detects an input current value that is input to the voltage converter from a voltage source; an output sensor which detects an output current value that is output to a load from the voltage converter; and a controller which determines a power efficiency of the voltage converter based on the input and output current values and which switches between the voltage conversion modes of the voltage converter according to the detected power efficiency. Accordingly, an efficiency of voltage conversion is maximized, and a usage time of a mobile device can be lengthened.

25 Claims, 8 Drawing Sheets

METHOD AND APPARATUS TO CONTROL VOLTAGE CONVERSION MODE

CROSS-REFERENCE TO RELATED APPLICATION

This application claims the benefit of Korean Application No. 2007-25136, filed Mar. 14, 2007, in the Korean Intellectual Property Office, the disclosure of which is incorporated herein by reference.

BACKGROUND OF THE INVENTION

1. Field of the Invention

Aspects of the present invention relate to a voltage converter, and more particularly, to a method and apparatus to control a voltage conversion mode of a voltage converter, such as a direct current to direct current (DC-DC) converter.

2. Description of the Related Art

In general, a voltage converter is a circuit which converts an input voltage to an output voltage that is different from that of the input voltage. FIG. 1 is a view showing an example of a direct current to direct current (DC-DC) converter, which is one kind of a voltage converter. Referring to FIG. 1, a DC input voltage supplied from a voltage source 110 is converted by a voltage converter 100 (a DC-DC converter) to a DC output voltage different from the input voltage and which is supplied to a load 120. The DC-DC converter is used in a mobile device that uses a battery as a voltage source or in various other devices.

In general, a voltage converter is classified into a DC-DC converter to convert a DC voltage into a DC voltage, an alternating current to alternating current (AC-AC) converter to convert an AC voltage into an AC voltage, a DC-AC converter to convert a DC voltage into an AC voltage, and an AC-DC converter to convert an AC voltage into a DC voltage. In addition, the voltage converter is classified into a switching converter and a linear converter. The switching converter controls an input voltage according to a supply period of a switching operation to generate an output voltage. In general, the switching converter is often used for a load which uses high power.

The switching converter may be distinguished between a pulse width modulation (PWM) converter or a pulse frequency modulation (PFM) converter. The PWM converter performs a switching operation every predetermined period in synchronization with a clock signal oscillating at a predetermined frequency. The PFM converter changes a switching period according to a power load. The linear converter attenuates an input voltage by a predetermined voltage to generate an output voltage having a desired magnitude. The linear converter uses a low drop out (LDO) method or the like, and is generally effective if used for the load which uses low power.

The voltage converter generally is most efficient if used with a specific input and a specific load, and accordingly, when the load decreases, a switching loss increases, and cause a decrease in a power efficiency. Therefore, a voltage conversion efficiency cannot be maximized according to changes of magnitudes in the input voltage, the output voltage, and the load, and a problem arise in that a usage time of a mobile device cannot be maximized.

SUMMARY OF THE INVENTION

Aspects of the present invention provide a method and apparatus to control a voltage conversion mode, which is capable of converting the voltage conversion mode according to a power efficiency, and maximizing an efficiency of a voltage conversion.

Aspects of the present invention also provide a method and apparatus to control the voltage conversion mode capable of lengthening a usage time of a mobile device, which uses a battery as a source, and minimizing stress caused by heat.

According to an aspect of the present invention, an apparatus to control a voltage conversion mode includes: a voltage converter which converts an input voltage into an output voltage and having a plurality of voltage conversion modes; an input sensor which detects an input current value that is input to the voltage converter from a voltage source; an output sensor which detects an output current value that is output to a load from the voltage converter; and a controller which determines a power efficiency of the voltage converter based on the input and output current values and which switches between the voltage conversion modes of the voltage converter according to the power efficiency.

According to an aspect of the present invention, the controller determines a duty value of the voltage converter based on the input and output current values and determines the power efficiency based on the duty value. The voltage converter is a direct current to direct current (DC-DC) converter.

According to an aspect of the present invention, the controller includes a pulse width modulation (PWM) controller to operate the voltage converter in a PWM mode; a pulse frequency modulation (PFM) controller to operate the voltage converter in a PFM mode; and a switching mode selector which determines the power efficiency of the voltage converter based on the input and output current values and operates the PWM controller or the PFM controller selectively according to the determined power efficiency.

According to an aspect of the present invention, the switching mode selector may operate the PWM controller if the power efficiency is a threshold power efficiency or more and operate the PFM controller if the power efficiency is less than the threshold power efficiency. The controller may further include a linear mode controller to operate the voltage converter in a linear mode.

According to an aspect of the present invention, the linear mode controller may operate the voltage converter in the linear mode if a switching frequency in the PFM mode is at or below a threshold frequency. The linear mode controller may be a low drop out (LDO) mode controller, the linear mode may be an LDO mode, and the threshold frequency may be in an audio frequency range.

According to an aspect of the present invention, the input sensor includes a hall sensor or a resistor and a comparator. The output sensor includes a hall sensor, or a resistor and a comparator. The voltage converter is a standard buck converter.

According to another aspect of the present invention, a method of controlling a voltage conversion mode of a voltage converter which convert an input voltage into an input voltage includes: detecting an input current value that is input to the voltage converter from a voltage source; detecting an output current value that is output to a load from the voltage converter; determining a power efficiency of the voltage converter based on the input and output current values; and switching the voltage conversion mode of the voltage converter according to the determined power efficiency.

According to another aspect of the present invention, a computer-readable medium having embodied thereon a computer program for a computer to perform the method of controlling a voltage conversion mode of a voltage converter which convert an input voltage into an input voltage, including detecting an input current value that is input to the voltage converter from a voltage source; detecting an output current value that is output to a load from the voltage converter; determining a power efficiency of the voltage converter based on the input and output current values; and switching the voltage conversion mode of the voltage converter according to the determined power efficiency.

According to another aspect of the present invention, a method of controlling a voltage conversion mode of a voltage converter includes determining a power efficiency of the voltage converter based on input and output current values; and switching the voltage conversion mode of the voltage converter to a different voltage conversion mode according to whether the determined power efficiency is at or above one or more threshold power efficiencies.

According to another aspect of the present invention an apparatus to control a voltage conversion mode includes a voltage converter which converts an input voltage into an output voltage and having a plurality of voltage conversion modes; and a controller which determines a power efficiency of the voltage converter based on detected input and output current values, and controls the voltage conversion to switch between the voltage conversion modes of the voltage converter according to whether the determined power efficiency is at or above one or more threshold power efficiencies.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENTS

Figure 1:
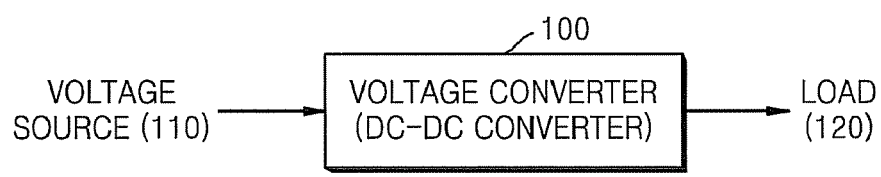
FIG. 1 is a view showing a related art DC-DC converter as an example of a general voltage converter.

Reference will now be made in detail to the aspects of the present invention, examples of which are illustrated in the accompanying drawings, wherein like reference numerals refer to the like elements throughout. The aspects are described below in order to explain the present invention by referring to the figures.

Figure 2:
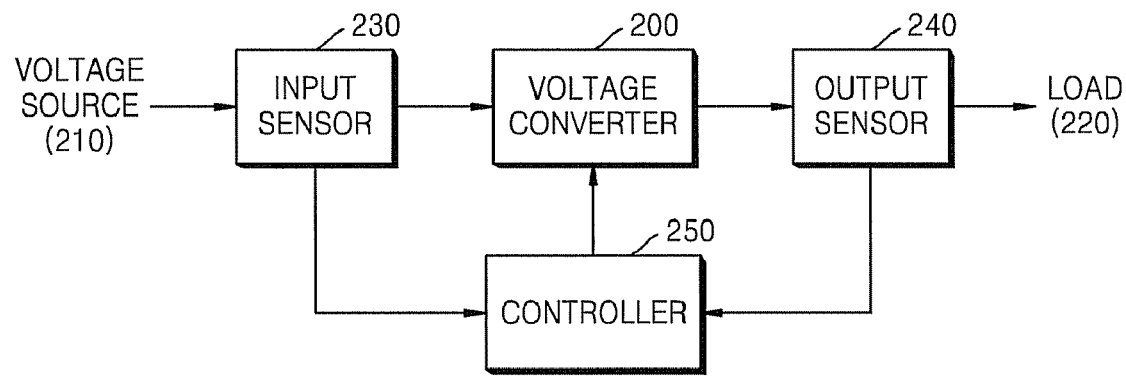
FIG. 2 is a view showing an apparatus to control a voltage conversion mode according to an aspect of the present invention.

FIG. 2 is a view showing an apparatus to control a voltage conversion mode according to an aspect of the present invention. Referring to FIG. 2, the apparatus includes a voltage converter 200, an input sensor 230, an output sensor 240, and a controller 250.

A voltage source 210 supplies a voltage with a predetermined magnitude to the voltage converter 200 through the input sensor 230. The voltage source 210 may be a battery to supply a DC voltage, an adaptor to convert an alternating current (AC) voltage (input from another voltage source (not shown)) into a DC voltage to supply the DC voltage, an AC power source, or any other power source.

The voltage converter 200 converts the input voltage that is input from the voltage source 210 via the input sensor 230 to an output voltage that is different from the input voltage. For example, a DC-DC converter may be used as the voltage converter 200. However, the voltage converter 200 is not limited to the DC-DC converter, and may be an AC-AC converter, a DC-AC converter, and an AC-DC converter.

The voltage converter 200 converts the input voltage into the output voltage in (or during) a mode (such as a switching mode or a liner mode) according to a control operation of the controller 250. The voltage converter 200 may be implemented with a switching mode operation circuit and a separate linear mode operation circuit, or implemented with circuits that share some elements (for example, a diode, a capacitor, and an inductor, etc) with one another. The voltage converter 200 may be implemented as a standard buck converter, according to an aspect of the invention. Operations of the voltage converter 200 implemented as the standard buck converter will be described in detail with reference to FIG. 5.

The load 220 is applied with the output voltage output from the voltage converter 200. The load 220 may be an electronic device, such as a liquid crystal display (LCD) device or a processor. In other aspects, various other devices, such as cell phones, portable game devices, laptop computers, or other similar devices are within the scope of the invention. Further, it is understood that the apparatus can be separate from the electronic devices, or can be integral with the electronic device.

The input sensor 230 detects an input current value that is input from the voltage source 210 to the voltage converter 200. The input sensor 230 may be constructed using a resistor and a comparator, a hall sensor, but not limited thereto. Since the input sensor 230 has an ideal internal resistance of close to 0, the voltage of the power source 210 and the input voltage of the voltage converter 200 are substantially the same. In addition, a current input from the voltage source 210 ideally flows via the input sensor 230 only to the voltage converter 200, but not to the controller 250. An example construction of the input sensor 230 will be described later in detail with reference to FIG. 5.

The output sensor 240 detects an output current value that is output from the voltage converter 200 to the load 220. The output sensor 240 may be constructed using a resistor and a comparator, or the hall sensor in a similar manner as the input sensor 230, but is not limited thereto and can have a construction other than that of the input sensor 230.

Since the shown output sensor 240 has a characteristic that is similar to that of the input sensor 230, a voltage applied to the load 220 and the output voltage of the voltage converter 200 are substantially the same. In addition, a current output from the voltage converter 200 ideally flows via the output sensor 240 only to the load 220, but not to the controller 250.

An example construction of the output sensor 240 will be described later in detail with reference to FIG. 5.

The controller 250 determines a power efficiency of the voltage converter 200 based on the input current value detected by the input sensor 230 and the output current value detected by the output sensor 240. As shown, a reason for detecting the input current value is that the voltage of the voltage source 210 is not constant and can be changed.

As a method of determining the power efficiency, the controller 250 determines a duty value of a pulse in the switching mode (that is, a pulse width modulation (PWM) mode or a pulse frequency modulation (PFM) mode) based on the input current value and the output current value, and determines the power efficiency in view of the duty value and a switching loss. The duty value refers to a ratio of a pulse width to a pulse period. It is represented by a percentage. Consideration of a voltage difference between the input voltage and the output voltage is not necessarily required in this case.

As another method of determining the power efficiency, the controller 250 detects the voltage difference (not shown) between the input voltage and the output voltage in addition to the input current value and the output current value to determine the power efficiency. For example, the voltage source 210 and the load 220 may be coupled to input terminals of an operational (OP) amplifier, and the controller 250 may receive output values thereof to determine the power efficiency. However, the method of determining power efficiency is not limited thereto but rather, various methods are possible.

According to the power efficiency determined by the aforementioned methods, the controller 250 selectively maintains a voltage conversion mode of the voltage converter 200 or switches the voltage conversion mode to another mode. Examples of the voltage conversion modes include the switching mode (such as the PWM mode and the PFM mode) and a linear mode (such as a low drop out (LDO) mode).

Figure 3:
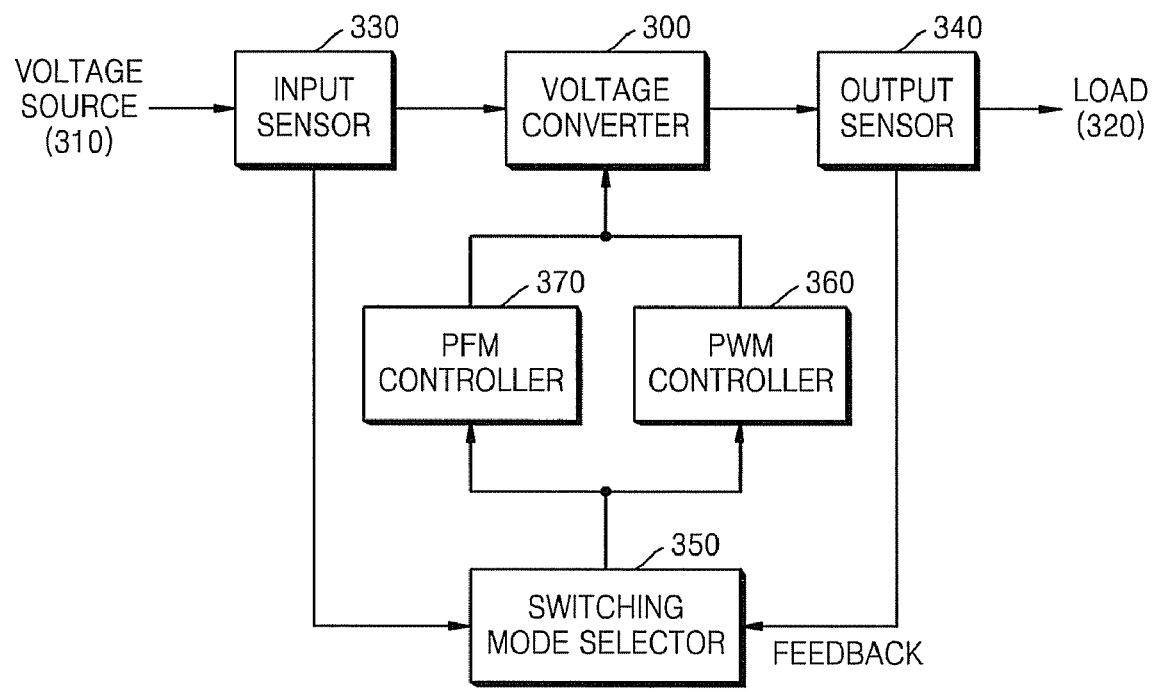
FIG. 3 is a view showing an apparatus to control a voltage conversion mode according to an aspect of the present invention.

FIG. 3 is a view showing an apparatus to control a voltage conversion mode according to another aspect of the present invention. Referring to FIG. 3, the apparatus to control a voltage conversion mode includes a voltage converter 300, an input sensor 330, an output sensor 340, a switching mode selector 350, a PWM (pulse width modulation) controller 360, and a PFM (pulse frequency modulation) controller 370. The voltage converter 300, the input sensor 330, and the output sensor 340 correspond to the voltage converter 200, the input sensor 230, and the output sensor 240 shown in FIG. 2, respectively. Accordingly, detailed descriptions thereof will not be repeated. In addition, the switching mode selector 350, the PWM controller 360, and the PFM controller 370 are components that correspond to the controller 250 in FIG. 2.

The PWM controller 360 controls the voltage converter 300 to operate in the PWM mode. More specifically, the PWM controller 360 controls switching of the voltage converter 300 to convert the input voltage in the PWM mode. For example, the PWM controller 360 controls a base current of a bipolar junction transistor (BJT) to operate the BJT as a switch. In general, the power efficiency in the PWM mode increases as a magnitude of the load increases when within a predetermined range. Since operations of the voltage converter 300 in the switching mode by the PWM controller 360 (for example, operations of the standard buck converter) are widely known by those skilled in the art, a detailed description thereof is omitted.

The PFM controller 370 controls the voltage converter 300 to operate in the PFM mode. The PFM mode is advantageous as compared with the PWM mode in that the PFM mode can be used to reduce switching loss as the magnitude of the load is small when within a predetermined range. In the various aspects according to the present invention, the PFM mode includes a pulse skipping modulation (PSM) mode.

The switching mode selector 350 determines the power efficiency of the power converter 300 based on the input current value detected by the input sensor 330 and the output current value detected by the output sensor 340. A method of determining the power efficiency is as described above regarding the controller 250.

In a general switching conversion method, power loss occurs due to switching loss and drive loss. However, within a switching mode, the drive loss is generally much smaller than the switching loss although the drive loss differs according to a power converting capacity. Therefore, efficiency of the switching mode is determined by a decrease in the number of switching that is performed.

The switching mode selector 350 selectively operates the PWM controller 360 or the PFM controller 370 according to the determined power efficiency. The switching mode selector 350, as a basis of selecting a switching mode, operates the PWM controller 360 when the power efficiency is at a threshold power efficiency or more (or above) and operates the PFM controller 370 when the power efficiency is at less than (or below) the threshold power efficiency. For example, the PWM mode is performed when the power efficiency is at 90% or more, and the PFM mode or the PSM mode is performed when the power efficiency is at less than 90% in order to reduce the switching loss. As shown, the threshold power efficiency can be differently set (selected or varied) according to encountered circumstance or various factors.

Figure 4:
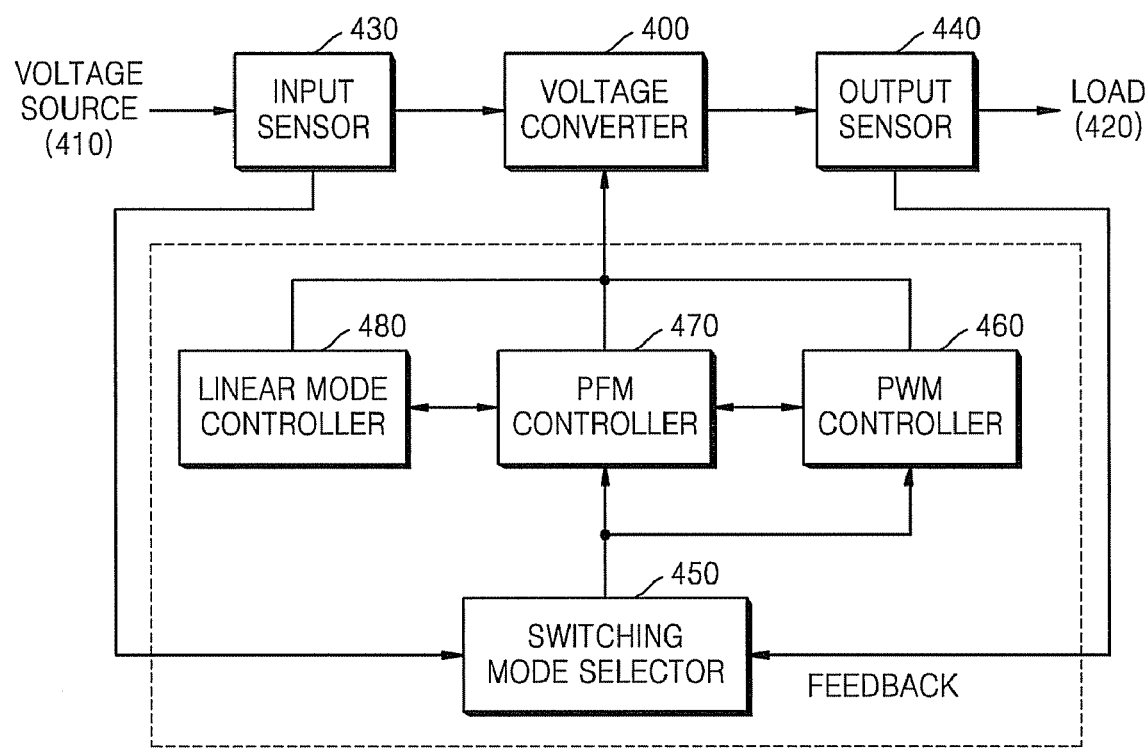
FIG. 4 is a view showing an apparatus to control a voltage conversion mode according to another aspect of the present invention.

FIG. 4 is a view showing an apparatus to control a voltage conversion mode according to another aspect of the present invention. Referring to FIG. 4, the apparatus includes a voltage converter 400, an input sensor 430, an output sensor 440, a switching mode selector 450, a PWM controller 460, a PFM controller 470, and a linear mode controller 480. The voltage converter 400, the input sensor 430, the output sensor 440, the switching mode selector 450, the PWM controller 460, and the PFM controller 470 correspond to the voltage converter 300, the input sensor 330, the output sensor 340, the switching mode selector 350, the PWM controller 360, and the PFM controller 370 shown in FIG. 3, respectively. Accordingly, a detailed description thereof is not repeated. In addition, the switching mode selector 450, the PWM controller 460, the PFM controller 470, and the linear mode controller 480 are components that correspond to the controller 250 shown in FIG. 2.

The linear mode controller 480 is a component to operate the voltage converter 400 in the linear mode. The linear mode controller 480 is operated if a switching frequency in the PFM mode decreases down to a threshold frequency or less. Whether the switching frequency is at or below the threshold frequency may be detected by the linear mode controller 480, by an additional detection circuit provided outside the linear mode controller 480, or by the PFM controller 470. When the switching frequency is at or below the threshold frequency in the PFM mode, the voltage converter 400 is switched to the linear mode by the linear mode controller 480, and the PFM controller 470 is inactivated. The linear mode controller 480 may be an LDO mode controller, and in the aspect shown, the voltage converter 400 operates in the LDO mode.

In addition, the aforementioned second threshold can be applied with a different (or various) value according to encountered circumstances or various factors. For example, by setting the threshold frequency to an audio frequency or a range thereof, noises that occur when the switching frequency decreases down to about 20 KHz or less can be prevented or reduced.

In general, in the liner mode voltage converter, a difference between the input voltage and the output voltage is caused by the linear regulator itself to therefore cause a heavy loss of power. Namely, in the liner mode, the power loss can be represented as (Vin−Vo)*Io+drive loss (where Vin refers to the input voltage, Vo refers to the output voltage, and Io refers to the output current). Since the drive loss in a general LDO method is relatively small, power loss in practice is determined by 1) a difference between the input voltage and the output voltage and 2) the output current, in that order. Accordingly, if the output current is small, even in the liner mode, the power efficiency becomes high to a certain degree.

Figure 5:
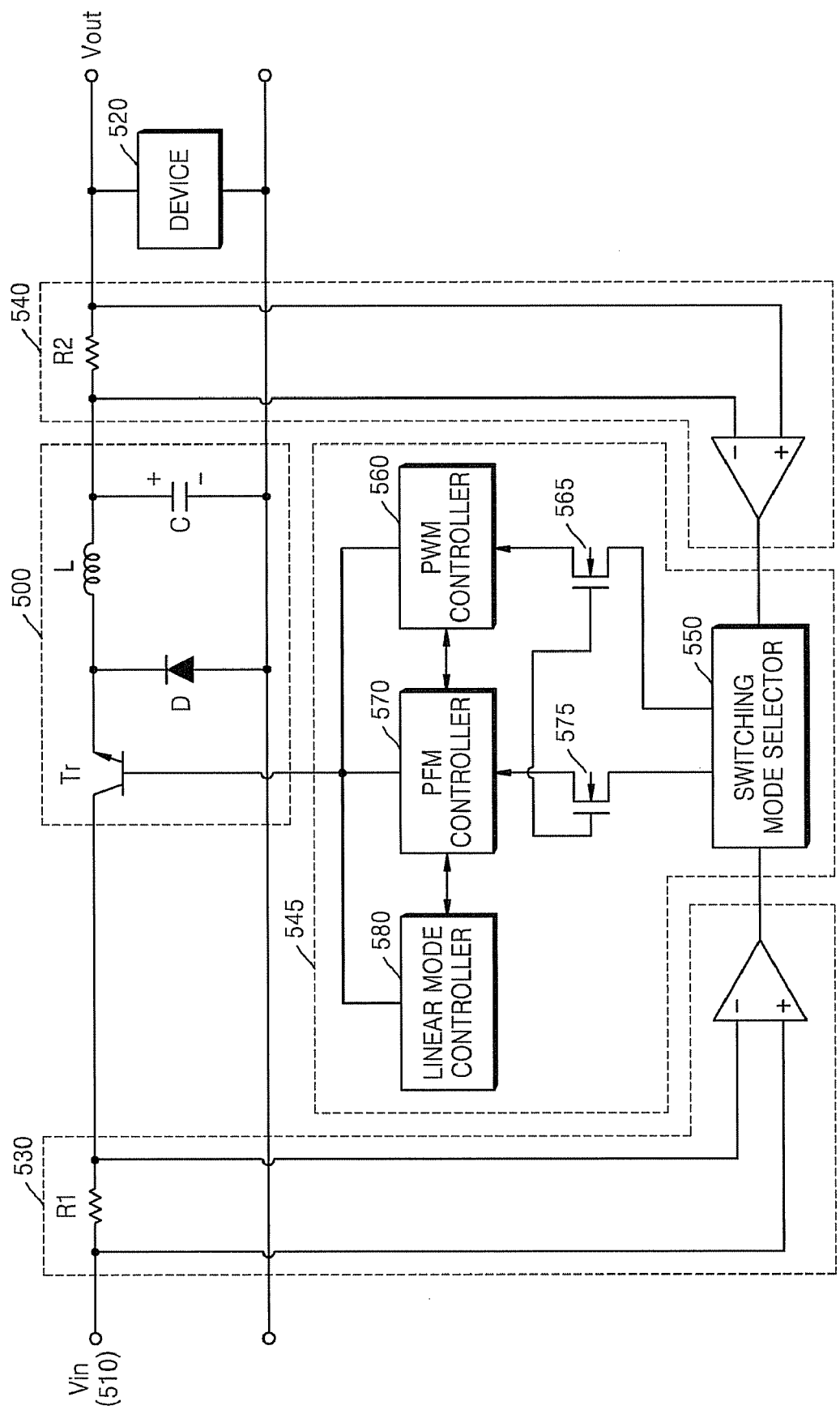
FIG. 5 is a view showing details of a circuit of the apparatus to control a voltage conversion mode shown in FIG. 4.

FIG. 5 is a view showing a detail of a circuit of the apparatus to control a voltage conversion mode shown in FIG. 4. Referring to FIG. 5, the apparatus includes a standard buck converter 500, an input sensor 530, and an output sensor 540, and a controller 545.

The standard buck converter 500 includes a BJT (bipolar junction transistor) Tr, a diode D, an inductor L, and a capacitor C. Parameters of the BJT Tr, the diode D, the inductor L, and the capacitor C are formats of a standard buck converter topology, and all values are controlled to be used for the switching converter. In addition, since a frequency of a general switching converter is several hundreds KHz, the diode D, the inductor L, and the capacitor C may be used as an output filter in the linear mode. In the linear mode, an active region of a switch is controlled to control the output voltage. Accordingly, the liner mode and the switching mode share a main power source path of the standard buck converter 500.

The input sensor 530 includes a resistance (or resistor) R1 and a first OP amp (operational amplifier). Accordingly, when a resistance value of the resistance R1 and voltages of both ends of the resistance R1 are obtained, a current flowing through the resistance R1 can be obtained. The output sensor 540 includes a resistance (or resistor) R2 and a second OP amp (operational amplifier). Similar to the input sensor 530, the output sensor 540 can detect a current flowing through the resistance R2.

The controller 545 includes a switching mode selector 550, a PWM controller 560, a PFM controller 570, a linear mode controller 580, a first metal-oxide-semiconductor field-effect transistor (MOSFET) 565, and a second MOSFET 575. The switching mode selector 550 determines the power efficiency of the standard buck converter 500 based on the input current value detected by the input sensor 530 and the output current value detected by the output sensor 540. In addition, based on the determined power efficiency, the switching mode selector 550 selectively operates the PWM controller 560 or the PFM controller 570 through the MOSFETs 565 and 575. The linear mode controller 580 operates the standard buck converter 500 in the linear mode when the switching frequency in the PFM mode decreases down to the threshold frequency or less (or below).

Figure 6:
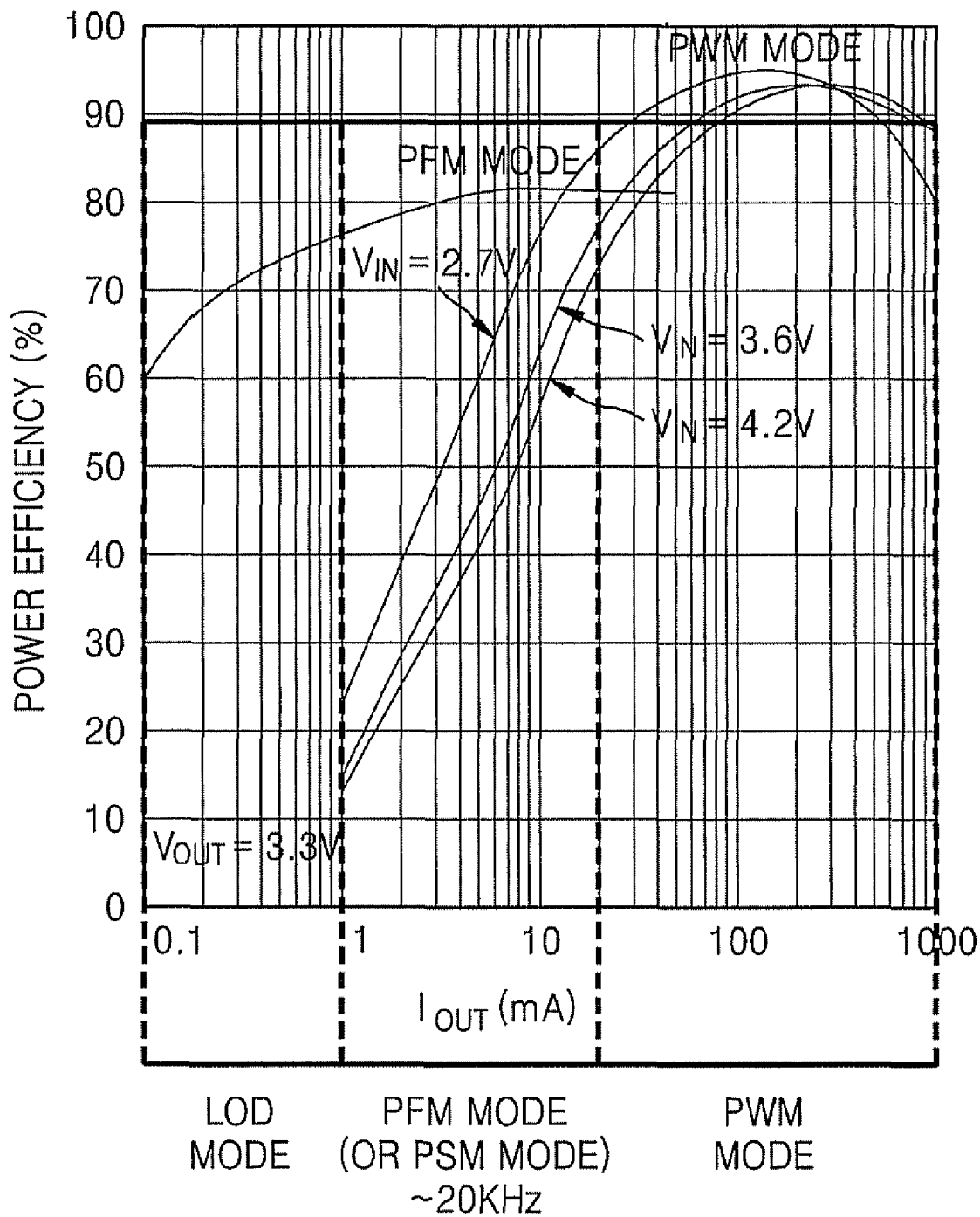
FIG. 6 is a graph showing a power efficiency according to an aspect of the present invention.

FIG. 6 is a graph showing a power efficiency according an aspect of the present invention. FIG. 6 shows changes in the power efficiency in each mode when the input voltage Vin is 2.7V, 3.6V, or 4.2V, and the output voltage Vout is 3.3V.

In the PWM mode, as a current $I_{out}$ decreases, the power efficiency decreases significantly. However, in the PFM mode, even when the current $I_{out}$ decreases, the power efficiency decreases relatively slowly as compared with the PWM mode. As shown, at a power efficiency of 90%, the PWM mode and the PFM mode switch, so that the power efficiency of the voltage converter can be maximized. In addition, the LDO mode is activated only when the output current is extremely small, so that current loss becomes very small.

Figure 7:
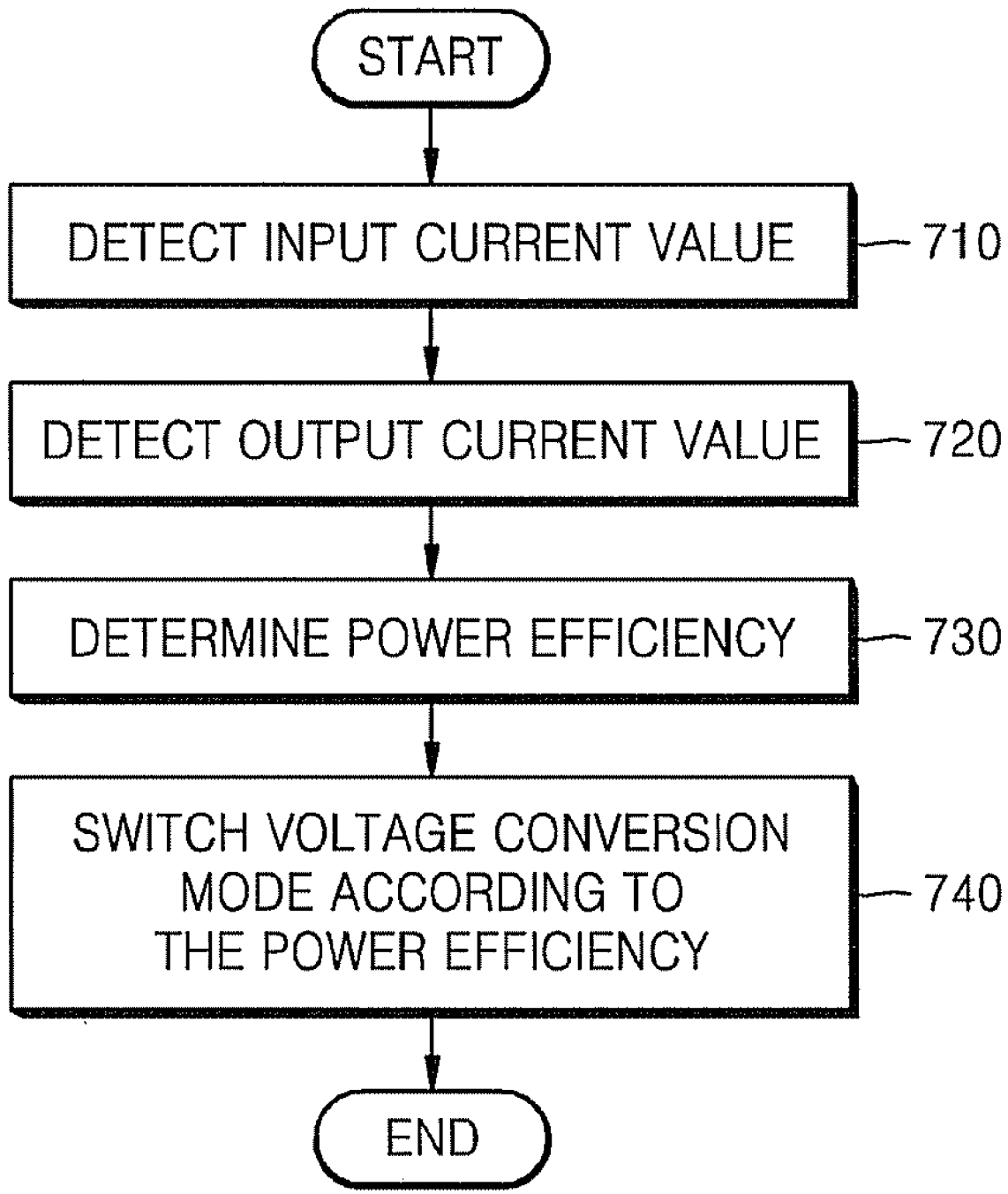
FIG. 7 is a flowchart showing a method of controlling a voltage conversion mode according to an aspect of the present invention.

FIG. 7 is a flowchart showing a method of controlling a voltage conversion mode according to an aspect of the present invention. Referring to FIG. 7, an apparatus to control a voltage conversion mode detects an input current value that is input to a voltage converter from a voltage source (operation 710). The voltage converter 200 may be a DC-DC converter and be implemented as a standard buck converter. The input current value can be detected with a resistor and a comparator, or a hall sensor.

Next, an output current value output from the voltage converter 200, 300, 400 to a load is detected (operation 720). The output current value can be detected by using a resistor and a comparator, or the hall sensor. Thereafter, based on the detected input and output current values, a power efficiency of the voltage converter 200, 300, 400 is determined (operation 730). A method of determining the power efficiency is as described above. Lastly, based on the determined power efficiency, the voltage conversion mode of the voltage converter 200, 300, 400 can be switched (operation 740).

Figure 8:
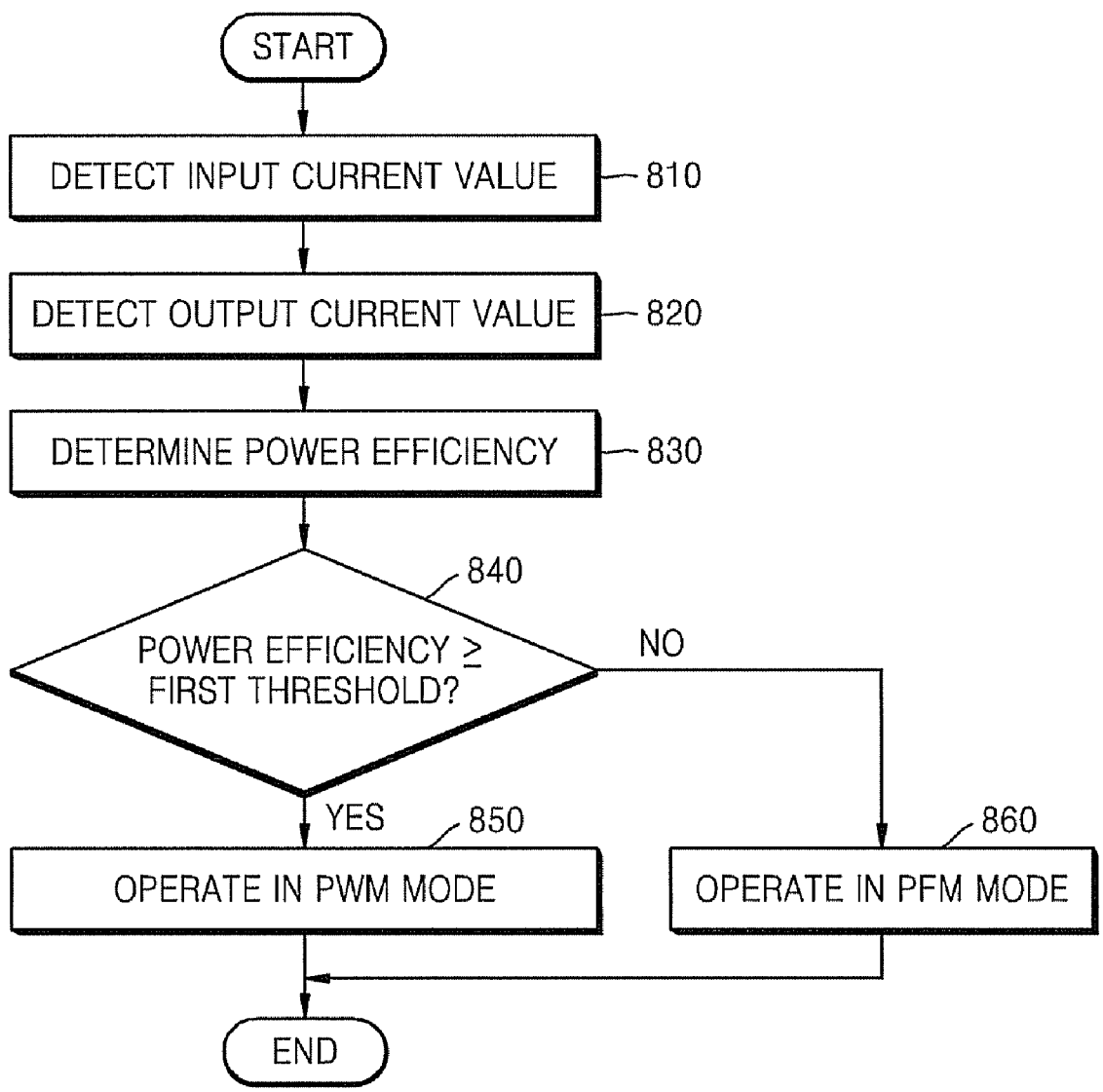
FIG. 8 is a flowchart showing a method of controlling a voltage conversion mode according to another aspect of the present invention.

FIG. 8 is a flowchart showing a method of controlling a voltage conversion mode according to another aspect of the present invention. Referring to FIG. 8, operations 810 to 830 correspond to operation 710 to 730 shown in FIG. 7, respectively. Accordingly, a detailed description thereof is not repeated.

In operation 840, an apparatus to control a voltage conversion mode determines whether a power efficiency is at a threshold power efficiency or more (or above). As shown, if the power efficiency is at or above the threshold power efficiency, the PWM mode is activated (operation 850), and if the power efficiency is less than (or below) the threshold power efficiency, the PFM mode is activated (operation 860). The threshold power efficiency is, for example, 90%, but can be otherwise determined.

Figure 9:
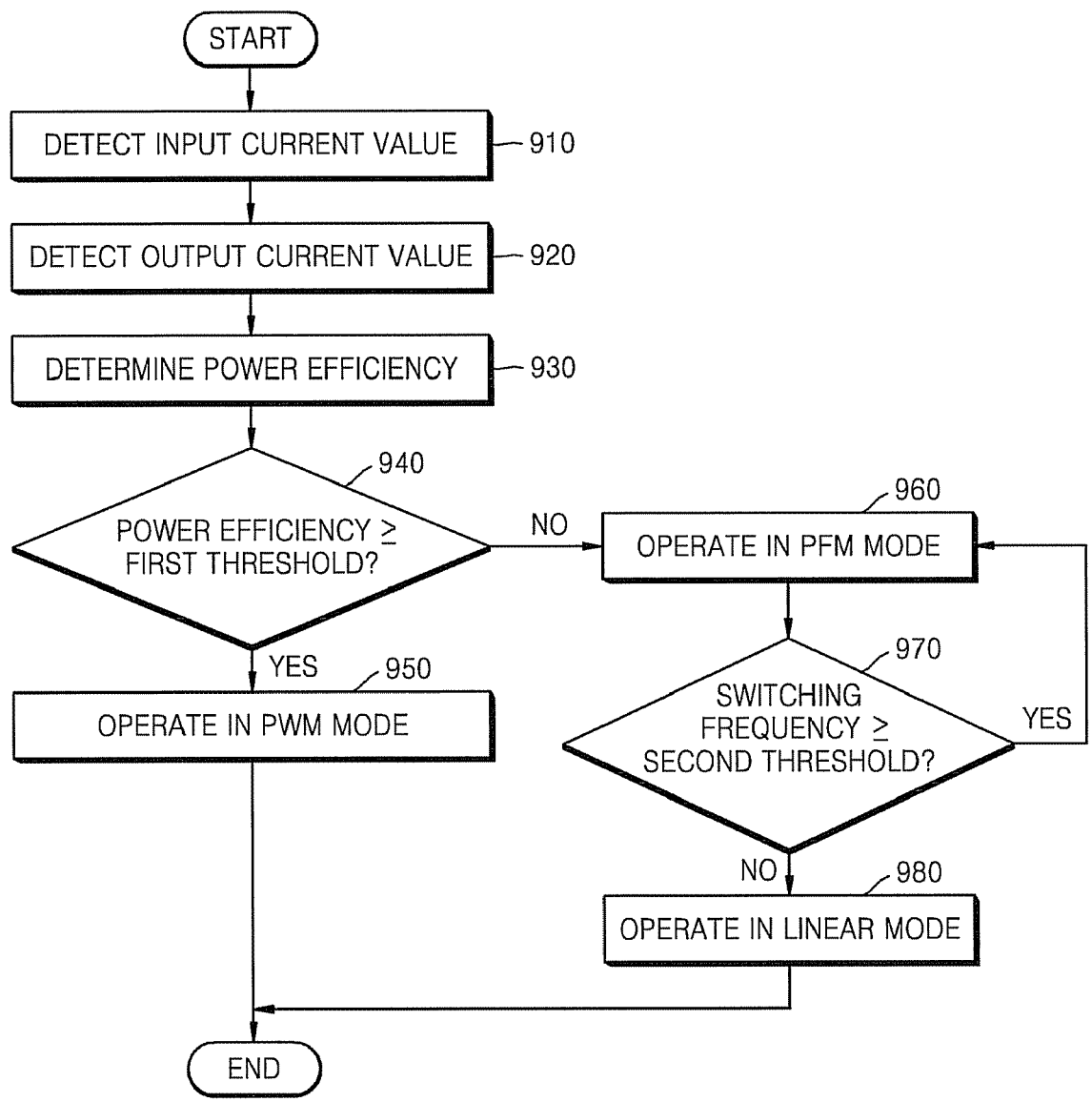
FIG. 9 is a flowchart showing a method of controlling a voltage conversion mode according to another aspect of the present invention.

FIG. 9 is a flowchart showing a method of controlling a voltage conversion mode according to another aspect of the present invention. Referring to FIG. 9, operations 910 to 930 correspond to operations 710 to 730 shown in FIG. 7, respectively. Accordingly, a detailed description thereof is not repeated.

An apparatus to control a voltage conversion mode determines whether a power efficiency is at a threshold power efficiency or more (or above) (operation 940). If the power efficiency is at the threshold power efficiency or more (or above), the PWM mode is activated (operation 950). The threshold power efficiency is, for example, 90%.

If the power efficiency is less than the threshold power efficiency, the PFM mode is activated (operation 960). Thereafter, when a switching frequency in the PFM mode decreases down to a threshold frequency or less (operation 970), the voltage converter is switched to a linear mode (operation 980). The linear mode is, for example, the LDO mode.

The threshold frequency may be in an audio frequency range. This is because when a switching frequency in the PFM mode decreases down to the audio frequency range (about 20 KHz) or less, noises occur which may cause inconvenience to a user to use the voltage converter.

As described above, according to aspects of the present invention, the method and apparatus to control a voltage conversion mode to switch to the PWM method, the PFM method, and the LDO method based on a power efficiency of a voltage converter. Therefore, an efficiency of the voltage conversion is maximized, a usage time of a mobile device (which uses a battery as a source) can be lengthened, and stress caused by heat can be minimized.

Aspects of the present invention can also be embodied as computer readable codes on a computer readable recording medium so that a computer may perform operations based on the computer readable codes. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. An apparatus to control a voltage conversion mode, comprising:
    a voltage converter which converts an input voltage into an output voltage and having a plurality of voltage conversion modes;
    an input sensor which detects an input current value that is input to the voltage converter from a voltage source;
    an output sensor which detects an output current value that is output to a load from the voltage converter; and
    a controller which determines a power efficiency of the voltage converter based on the input and output current values and which switches between the voltage conversion modes of the voltage converter according to the determined power efficiency,
    wherein the controller comprises
        a pulse width modulation (PWM) controller to operate the voltage converter in a PWM mode;
        a pulse frequency modulation (PFM) controller to operate the voltage converter in a PFM mode; and
        a switching mode selector which determines the power efficiency of the voltage converter based on the input and output current values and operates the PWM controller or the PFM controller selectively according to the determined power efficiency.

2. The apparatus of claim 1, wherein the controller determines a duty value of the voltage converter based on the input and output current values and determines the power efficiency based on the duty value.

3. The apparatus of claim 1, wherein the voltage converter is a direct current to direct current (DC-DC) converter.

4. The apparatus of claim 1, wherein the switching mode selector operates the PWM controller if the power efficiency is a threshold power efficiency or more and operates the PFM controller if the power efficiency is less than the threshold power efficiency.

5. The apparatus of claim 1, wherein the controller further comprises a linear mode controller to operate the voltage converter in a linear mode.

6. The apparatus of claim 5, wherein the linear mode controller operates the voltage converter in the linear mode if a switching frequency in the PFM mode is at or below a threshold frequency.

7. The apparatus of claim 6, wherein the linear mode controller is a low drop out (LDO) mode controller, the linear mode is an LDO mode, and the threshold frequency is in an audio frequency range.

8. The apparatus of claim 1, wherein the input sensor comprises a hall sensor, or a resistor and a comparator.

9. The apparatus of claim 1, wherein the output sensor includes a hall sensor, or a resistor and a comparator.

10. The apparatus of claim 1, wherein the voltage converter is a standard buck converter.

11. A method of controlling a voltage conversion mode of a voltage converter which convert an input voltage into an output voltage, the method comprising:
    detecting an input current value that is input to the voltage converter from a voltage source;
    detecting an output current value that is output to a load from the voltage converter;
    determining a power efficiency of the voltage converter based on the input and output current values; and
    switching the voltage conversion mode of the voltage converter according to the determined power efficiency,
    wherein in switching the voltage conversion mode of the voltage converter, the voltage converter is controlled to switch to a pulse width modulation (PWM) mode or a pulse frequency modulation (PFM) mode according to the power efficiency.

12. The method of claim 11, wherein in determining the power efficiency of the voltage converter, a duty value of the voltage converter is determined based on the input and output current values, and the power efficiency is determined based on the duty value.

13. The method of claim 11, wherein the voltage converter is a direct current to direct current (DC-DC) converter.

14. The method of claim 11, wherein in switching the voltage conversion mode of the voltage converter, if the power efficiency increases to a threshold power efficiency or more, the voltage conversion mode is switched from the PFM mode to the PWM mode, and if the power efficiency decreases to less than the threshold power efficiency, the voltage conversion mode is switched from PWM mode to the PFM mode.

15. The method of claim 14, wherein in switching the voltage conversion mode of the voltage converter, when a switching frequency in the PFM mode decreases to a threshold frequency or less, the voltage conversion mode is switched from the PFM mode to a linear mode.

16. The method of claim 15, wherein the linear mode is an LDO mode, and the threshold frequency is in an audio frequency range.

17. The method of claim 11, wherein the detecting the input current value uses a hall sensor, or a resistor and a comparator.

18. The method of claim 11, wherein the detecting the output current value uses a hall sensor, or a resistor and a comparator.

19. The method of claim 11, wherein the voltage converter is a standard buck converter.

20. A method of controlling a voltage conversion mode of a voltage converter comprising:
    determining a power efficiency of the voltage converter based on input and output current values; and
    switching the voltage conversion mode of the voltage converter to a different voltage conversion mode according to whether the determined power efficiency is at or above one or more threshold power efficiencies,
    wherein if the determined power efficiency is at or above a threshold power efficiency, the voltage converter is operated in a PWM (pulse width modulation) mode, and otherwise, the voltage converter is operated in a PFM (pulse frequency modulation) mode.

21. The method of claim 20, wherein:
if a switching frequency in the PFM mode is at or below a threshold frequency, the voltage conversion mode is switched from the PFM mode to a linear mode.

22. The method of claim 21, wherein a duty value is determined based on the input and output current values, and the power efficiency is determined based on the duty value and a switching loss.

23. An apparatus to control a voltage conversion mode, comprising:
a voltage converter which converts an input voltage into an output voltage and having a plurality of voltage conversion modes; and
a controller which determines a power efficiency of the voltage converter based on detected input and output current values, and controls the voltage conversion to switch the voltage conversion modes of the voltage converter according to whether the determined power efficiency is at or above one or more threshold power efficiencies,
wherein if the controller determines that the power efficiency is at or above a threshold power efficiency, the voltage converter is operated in a PWM (pulse width modulation) mode, and otherwise, the voltage converter is operated in a PFM (pulse frequency modulation) mode.

24. The apparatus of claim 23, wherein:
if a switching frequency in the PFM mode is at or below a threshold frequency, the controller controls the voltage conversion to switch the voltage conversion mode of the voltage converter from the PFM mode to a linear mode.

25. The apparatus of claim 23, wherein the controller determines a duty value based on the input and output current values, and the controller further determines that the power efficiency based on the duty value and a switching loss.

* * * * *